US010298428B2

United States Patent
Taya

(10) Patent No.: US 10,298,428 B2
(45) Date of Patent: May 21, 2019

(54) WIRELESS TRANSMISSION DEVICE AND WIRELESS TRANSMISSION METHOD

(71) Applicant: LAPIS Semiconductor Co., Ltd., Yokohama (JP)

(72) Inventor: Takashi Taya, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

(21) Appl. No.: 15/400,035

(22) Filed: Jan. 6, 2017

(65) Prior Publication Data

US 2017/0201402 A1 Jul. 13, 2017

(30) Foreign Application Priority Data

Jan. 8, 2016 (JP) .................. 2016-002152

(51) Int. Cl.
*H04L 27/20* (2006.01)
*H04L 7/033* (2006.01)
*H04L 27/04* (2006.01)
*H04W 52/52* (2009.01)

(52) U.S. Cl.
CPC .............. *H04L 27/20* (2013.01); *H04L 7/033* (2013.01); *H04L 27/04* (2013.01); *H04W 52/52* (2013.01)

(58) Field of Classification Search
CPC ......... H04L 27/20; H04L 7/033; H04L 27/04; H04W 52/52
USPC .................... 375/295, 309; 332/103; 455/102
See application file for complete search history.

(56) References Cited

U.S. PATENT DOCUMENTS

| 2010/0102895 A1* | 4/2010 | Beukema | ............ H04L 27/0008 |
| | | | 332/103 |
| 2011/0236027 A1* | 9/2011 | Nosaka | ............... H03F 3/45085 |
| | | | 398/135 |
| 2011/0300816 A1* | 12/2011 | Collados | .................. H04L 27/04 |
| | | | 455/102 |

FOREIGN PATENT DOCUMENTS

JP          2004-200930 A    7/2004

* cited by examiner

*Primary Examiner* — Chieh M Fan
*Assistant Examiner* — Fitwi Y Hailegiorgis
(74) *Attorney, Agent, or Firm* — Rabin & Berdo, P.C.

(57) ABSTRACT

A wireless transmission device includes a reception circuit that receives a ASK or PSK designation signal designating amplitude-shift keying (ASK) or phase-shift keying (PSK), respectively, an amplitude control signal generation circuit that generates an amplitude control signal having an amplitude corresponding to a change in a signal level of the data signal, a polarity reversal circuit that generates a polarity reversal signal by reversing a polarity of a carrier wave signal according to the signal level of the data signal upon receiving a ASK designation signal, an amplifier circuit that generates a PSK signal by amplifying the polarity reversal signal at an amplification rate based on the amplitude control signal upon receiving a PSK designation signal, and generates an ASK signal by modulating an amplitude of the carrier wave signal at an amplification rate based on the amplitude control signal upon receiving the ASK designation signal.

15 Claims, 7 Drawing Sheets

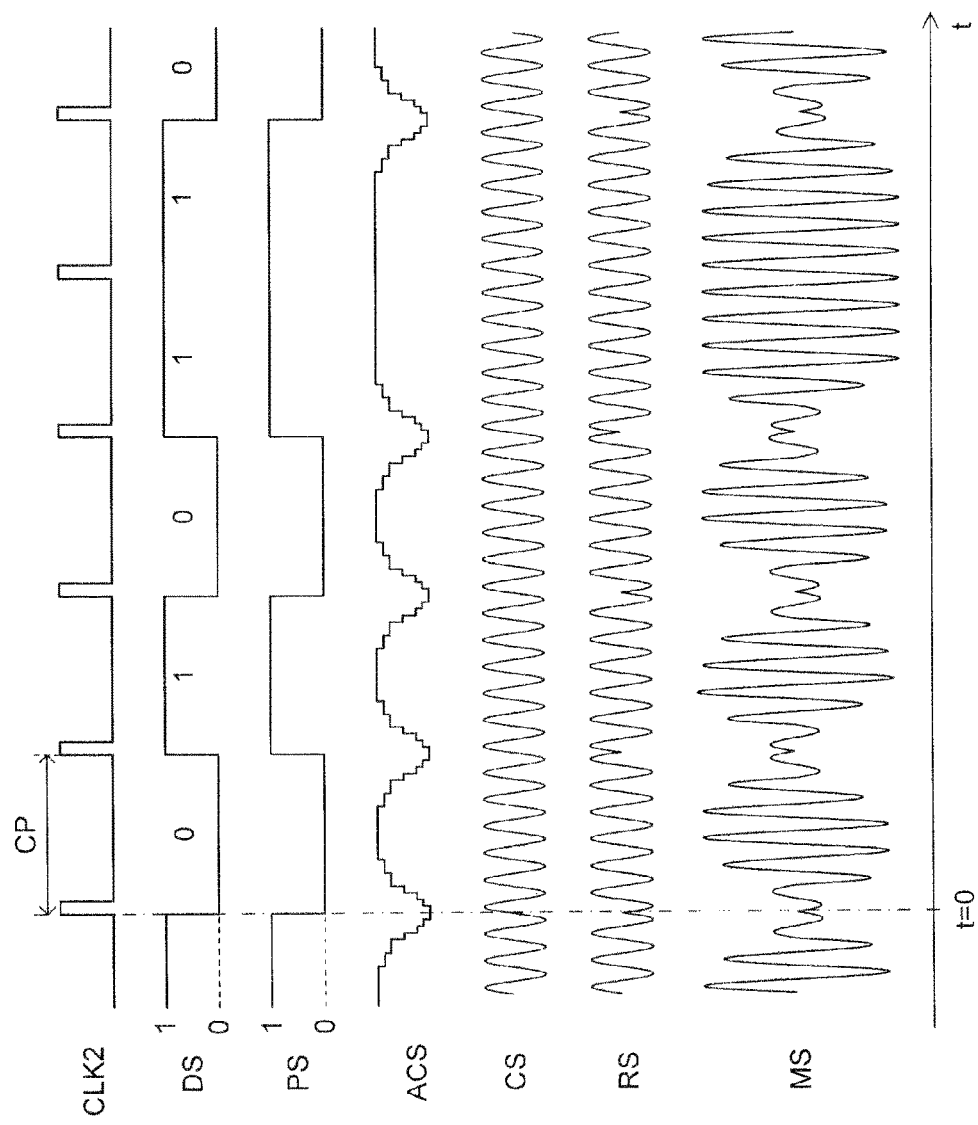

WIRELESS TRANSMISSION DEVICE AND WIRELESS TRANSMISSION METHOD

BACKGROUND OF THE INVENTION

Technical Field

The present invention relates to a wireless transmission device and a wireless transmission method, and in particular, to a wireless transmission device and a wireless transmission method by which wireless transmission in ASK modulation mode and BPSK modulation mode is performed.

Background Art

In recent years, specified low power wireless communication using 300 MHz to 900 MHz electromagnetic waves, known as the sub-giga range, are widely used in wireless communication. In specified low power wireless communication, a code spreading technique defined according to the IEEE 802.15.4k standard, for example, is used in order to extend transmission distance, and as a modulation mode, phase shift keying (PSK) such as binary phase shift keying (BPSK) is used. Amplitude shift keying (ASK) is used by which modulation and demodulation of a simple circuit can be performed. Wireless devices that have a modulation means that can handle both PSK and ASK modulation modes have been conceived of (Japanese Patent Application Laid-Open Publication No. 2004-200930, for example).

SUMMARY OF THE INVENTION

In wireless transmission, spurious emission including unwanted signal components that are not designed to be emitted occurs in addition to output signals in the frequency band that is theoretically set. Spurious emission is a cause for electromagnetic interference, and thus, the intensity thereof is restricted by the Radio Law. Thus, modulation when performing wireless transmission needs to be performed while smoothly changing the amplitude in order to mitigate spurious emission. In wireless transmission using ASK modulation, for example, typically after converting transmission data to an analog signal, the analog signal is mixed with a carrier wave to perform amplitude modulation. Thus, a D/A converter for converting transmission data to an analog signal and a mixer (multiplier) for mixing the converted analog signal with a carrier wave are needed.

Also, in the case of wireless transmission by PSK modulation, transmission data is converted to an in-phase (I) signal and a quadrature (Q) signal, and after each of the signals is converted to an analog signal and mixed with a carrier wave, the signals are added together to generate a modulation wave. Thus, two systems would need to be provided to handle the I signal and the Q signal, and an adder to add the two signals would also be necessary. Thus, performing wireless transmission to handle both ASK and BPSK modulation modes has presented the problem that a large scale transmission circuit would be necessary.

In such a wireless transmission device, after the carrier wave is modulated to generate a modulation wave, the modulation wave is amplified and transmitted. Since the modulation wave is an analog signal, it is preferable that the wireless transmission device include an amplifier circuit with a high degree of linearity in order not to distort the waveform of the signal during amplification. This has presented the problem that a linear amplifier circuit with a low power efficiency such as a class-A amplifier circuit or a class-B amplifier circuit would be necessary, which would result in a high power consumption transmission circuit.

In order to solve the above-mentioned problems, an object of the present invention is to provide a wireless transmission device and a wireless transmission method by which it is possible to perform wireless transmission by both ASK and BPSK modulation modes while mitigating an increase in circuit size and power consumption.

According to one aspect of the invention, a wireless transmission device for modulating, by amplitude-shift keying (ASK) or phase-shift keying (PSK), a data signal including an array of binary signal levels, and transmitting a modulated data signal, the wireless transmission device includes a modulation designation reception circuit configured to receive a ASK designation signal that designates the ASK or a PSK designation signal that designates the PSK, a signal generation circuit configured to generate a carrier wave signal, an amplitude control signal generation circuit configured to receive the data signal, and to generate an amplitude control signal having an amplitude corresponding to a change in a signal level of the data signal, a polarity reversal circuit configured to generate a polarity reversal signal by reversing a polarity of the carrier wave signal according to the signal level of the data signal in response to reception of the PSK designation signal by the modulation designation reception circuit, an amplifier circuit configured to generate a PSK signal by amplifying the polarity reversal signal at an amplification rate based on the amplitude control signal in response to the reception of the PSK designation signal by the modulation designation reception circuit, and to generate an ASK signal by modulating an amplitude of the carrier wave signal at the amplification rate based on the amplitude control signal in response to reception of the ASK designation signal by the modulation designation reception circuit, and a transmission circuit configured to transmit the ASK signal or the PSK signal.

According to one aspect of the invention, a wireless transmission method for transmitting a modulated signal by modulating a data signal including an array of binary signal levels, using amplitude-shift keying (ASK) or phase-shift keying (PSK), the method includes receiving a ASK designation signal that designates the ASK or a PSK designation signal that designates the PSK, generating a carrier wave signal, receiving the data signal and generating an amplitude control signal having an amplitude corresponding to a change in the signal level of the data signal, generating a polarity reversal signal by reversing a polarity of the carrier wave signal according to the signal level of the data signal in response to reception of the PSK designation signal by the modulation designation reception circuit, generating a PSK signal by amplifying the polarity reversal signal at an amplification rate based on the amplitude control signal in response to the reception of the PSK designation signal by the modulation designation reception circuit, and generating an ASK signal by modulating an amplitude of the carrier wave signal at an amplification rate based on the amplitude control signal in response to reception of the ASK designation signal by the modulation designation reception circuit, and transmitting the ASK signal or the PSK signal.

According to the present invention, it is possible to perform wireless transmission by both ASK and BPSK modulation modes while mitigating an increase in circuit size and power consumption.

BRIEF DESCRIPTION OF THE DRAWINGS

FIG. 7 is a time chart showing waveforms of signals generated in BPSK mode.

DETAILED DESCRIPTION OF EMBODIMENTS

An embodiment of the present invention will be explained in detail below with reference to the drawings.

Figure 1:
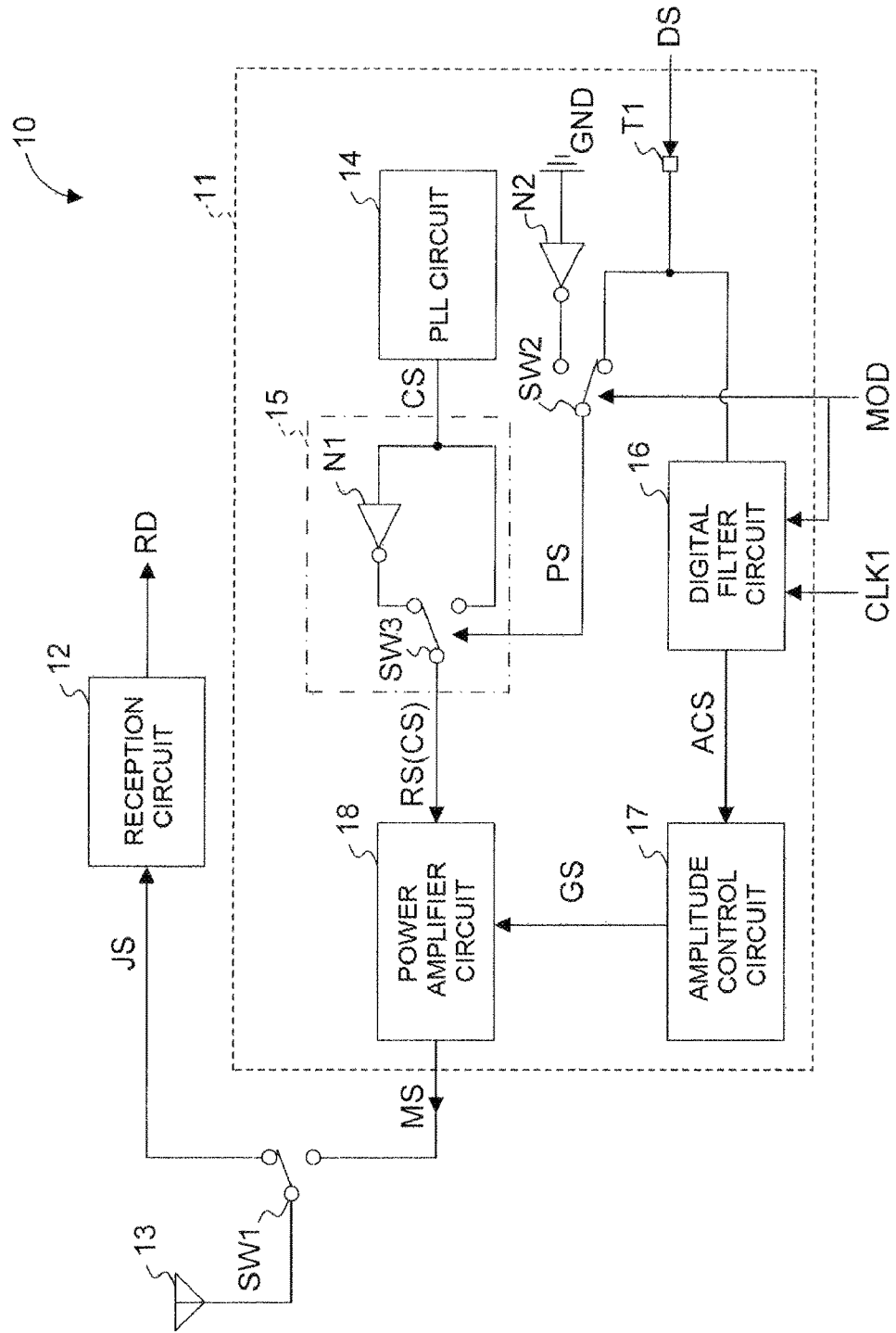
FIG. 1 is a block diagram showing a configuration of a wireless communication device of the present invention.

FIG. 1 is a block diagram showing a configuration of a wireless communication device 10 according to the present invention. The wireless communication device 10 includes a transmission circuit 11, a reception circuit 12, an antenna 13, and a switch SW1. The wireless communication device 10 is configured to connect the transmission circuit 11 to the antenna 13 by toggling the switch SW1 to perform a transmission operation as a wireless transmission device. Also, the wireless communication device 10 is configured to connect the reception circuit 12 to the antenna 13 by toggling the switch SW1 to perform a reception operation as a wireless reception device.

The wireless communication device 10 is configured so as to be able to perform wireless transmission in both amplitude shift keying (ASK) mode, which is a first modulation mode, and binary phase shift keying (BPSK) mode, which is a second modulation mode. The wireless communication device 10 receives as input a mode designation signal that designates use of a transmission mode by which modulation is performed in BPSK modulation mode (hereinafter referred to as BPSK mode) or a transmission mode by which modulation is performed in ASK modulation mode (hereinafter referred to as ASK mode), and transmission of wireless signals is performed by switching to the transmission mode designated by the mode designation signal.

The transmission circuit 11 includes a phase locked loop (PLL) circuit 14, a polarity reversal circuit 15, a digital filter circuit 16, an amplitude control circuit 17, a power amplifier circuit 18, a data input terminal T1, and a switch SW2.

The data input terminal T1 receives a data signal to be transmitted (hereinafter referred to as a transmission data signal DS) as input. The transmission data signal DS is a digital signal including an array of binary signal levels having logical values of "0" and "1".

The switch SW2 is a modulation designation reception circuit that receives as input a mode designation signal MOD that designates whether to use ASK mode or BPSK mode, and switches the polarity reversal circuit 15 between being connected to the data input terminal T1 and ground potential GND according to the mode designation signal MOD supplied from outside the transmission circuit 11.

If a mode designation signal MOD indicating BPSK mode is supplied (that is, BPSK modulation is designated), the switch SW2 connects the polarity reversal circuit 15 to the data input terminal T1. In this manner, the transmission data signal DS is supplied to the polarity reversal circuit 15 as a polarity control signal PS.

On the other hand, if a mode designation signal MOD indicating ASK mode is supplied (that is, ASK modulation is designated), the switch SW2 connects the polarity reversal circuit 15 to the ground potential GND through the inverter N2. In this manner, a signal having a uniform signal level with a logical value of "1" is supplied to the polarity reversal circuit 15 as the polarity control signal PS.

The PLL circuit 14 is a phase-locked loop circuit including a voltage-controlled oscillator (VCO), a loop filter, a phase comparator, a divider, and the like, and generates a carrier wave signal CS of 900 MHz, for example.

The polarity reversal circuit 15 includes an inverter N1 and a switch SW3. The inverter N1 inverts the logic level of the carrier wave signal CS supplied from the PLL circuit 14. The switch SW3 switches the connection according to the polarity control signal PS, and connects the power amplifier circuit 18 to the PLL circuit 14 either directly or through the inverter N1. Specifically, while the signal level of the polarity control signal PS is "1", the PLL circuit 14 is directly connected to the power amplifier circuit 18, and while the signal level of the polarity control signal PS is "0", the PLL circuit 14 is connected to the power amplifier circuit 18 through the inverter N1. In this manner, a polarity reversal signal RS is generated, the polarity reversal signal having the same logic level (positive polarity) as the carrier wave signal CS when the signal level of the polarity control signal PS is "1", and a logic level (negative polarity) in which the polarity of the carrier wave signal CS is reversed (that is, the phase of the carrier wave signal CS is shifted) 180° when the signal level of the polarity control signal PS is "0". In other words, the polarity reversal signal RS has the same phase as the carrier wave signal CS while the signal level of the polarity control signal PS is "1" and is in the opposite phase to the carrier wave signal CS while the signal level of the polarity control signal PS is "0".

As described above, the transmission data signal DS is supplied to the switch SW3 of the polarity reversal circuit 15 as a polarity control signal PS in BPSK mode. Thus, in BPSK mode, the polarity reversal circuit 15 generates the polarity reversal signal RS in which the polarity of the carrier wave signal CS is reversed according to the signal level of the transmission data signal DS, and supplies this signal to the power amplifier circuit 18.

On the other hand, in ASK mode, a signal having a uniform signal level with a logical value of "1" is supplied to switch SW3 of the polarity reversal circuit 15 as the polarity control signal PS. Thus, in ASK mode, the polarity reversal circuit 15 supplies the carrier wave signal CS as is, without reversing the polarity thereof, to the power amplifier circuit 18.

The digital filter circuit 16 is an amplitude control signal generation circuit that performs a filtering process on the transmission data signal DS, and generates an amplitude control signal ACS having an amplitude corresponding to the change in signal level of the transmission data signal DS. The digital filter circuit 16 has filtering characteristics according to the band limit of the transmission signal such as Gaussian characteristics or Nyquist filter characteristics, for example. An operation clock signal CLK1 and the mode designation signal MOD are supplied to the digital filter circuit 16.

Figure 2:
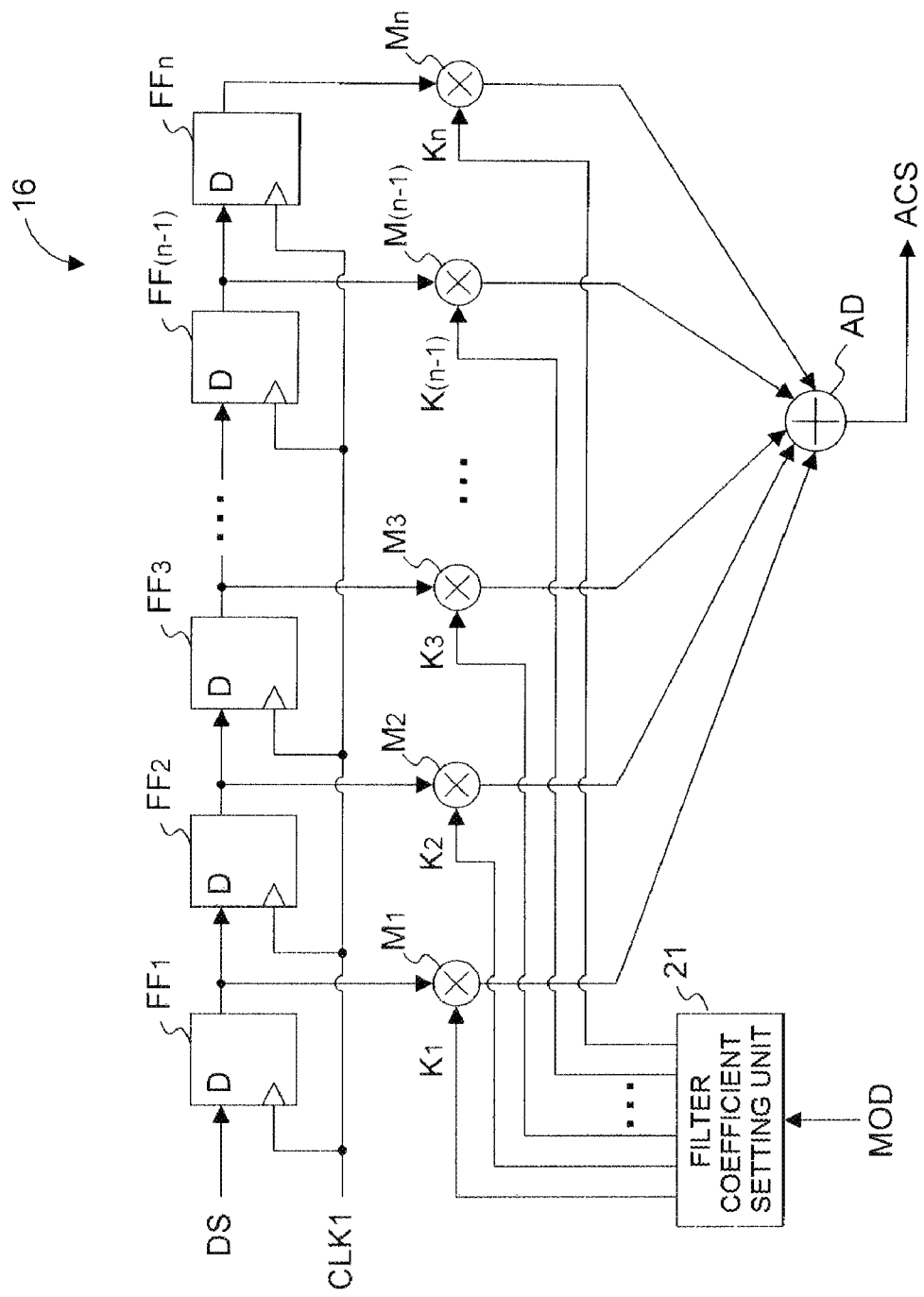
FIG. 2 shows a configuration of a digital filter circuit of the present invention.

The digital filter circuit 16 includes a transversal filter such as shown in FIG. 2, for example, and includes an n number (n being an integer of 2 or greater) of flip-flops $FF_1$ to $FF_n$ that are in a cascade connection, an n number of coefficient multipliers $M_1$ to $M_n$, and an adder AD. The flip-flops $FF_1$ to $FF_n$ take in the transmission data signal DS supplied from the data input terminal T1 while sequentially shifting the transmission data signal when the operation clock signal CLK1 rises. The operation clock signal CLK1 is faster than a clock signal (data clock signal CLK2) that is synchronous with data transition of the transmission data signal DS, and thus, a plurality of the same data value are taken in when the operation clock signal CLK1 rises. The coefficient multipliers $M_1$ to $M_n$ multiply filter coefficients $K_1$ to $K_n$ with each of the outputs from the flip-flops $FF_1$ to $FF_n$. The adder AD adds all multiplication results of the coefficient multipliers $M_1$ to $M_n$ and outputs the addition results as the amplitude control signal ACS.

Also, the digital filter circuit 16 has a filter coefficient setting unit 21 that switches the setting of the filter coefficient in the coefficient multipliers $M_1$ to $M_n$ according to the mode designation signal MOD. In other words, the filter coefficient setting unit 21 receives the mode designation signal MOD and modifies the filter coefficients $K_1$ to $K_n$ according to whether the mode designation signal MOD designates ASK mode or BPSK mode. In this manner, differing filter coefficients $K_1$ to $K_n$ are set for ASK mode and BPSK mode. Thus, even if transmission data signals DS having the same waveform were inputted, for example, they would result in amplitude control signals ACS having different waveforms being outputted depending on whether ASK mode or BPSK mode was selected.

The amplitude control circuit 17 controls the amplification rate of the power amplifier circuit 18 on the basis of the amplitude control signal ACS. The amplitude control circuit 17 supplies to the power amplifier circuit 18 a power source voltage VDD based on the amplitude of the amplitude control signal ACS, a gate bias voltage VG based on the amplitude of the amplitude control signal ACS, switch control signals S1 to S4 that change the number of amplification stages or the like of the power amplifier circuit 18, and the like (below, these are also collectively referred to as amplification rate control signals GS), thereby controlling the amplification rate of the power amplifier circuit 18.

The power amplifier circuit 18 amplifies the signal (polarity reversal signal RS or carrier wave signal CS) supplied from the polarity reversal circuit 15 at an amplification rate based on the amplitude control signal ACS. In BPSK mode, for example, the polarity reversal signal RS is supplied from the polarity reversal circuit 15, and thus, the power amplifier circuit 18 amplifies the polarity reversal signal RS at the amplification rate based on the amplitude control signal ACS and derives a BPSK modulation signal in BPSK mode.

On the other hand, in ASK mode, the carrier wave signal CS is supplied from the polarity reversal circuit 15, and thus, the power amplifier circuit 18 performs amplitude modulation of the carrier wave signal CS at the amplification rate based on the amplitude control signal ACS and derives an ASK modulation signal.

Figure 3:
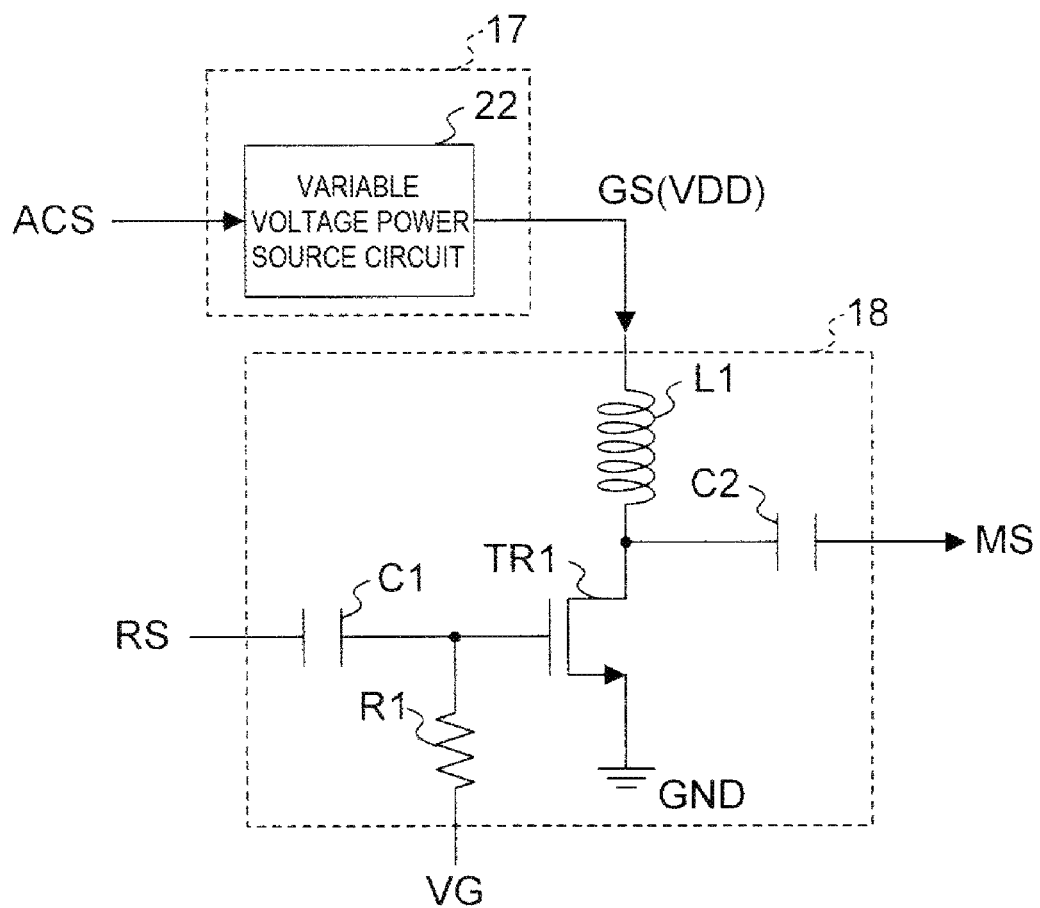
FIG. 3 shows a configuration example of an amplitude control circuit and a power amplifier circuit.

FIG. 3 shows a configuration example of the amplitude control circuit 17 and the power amplifier circuit 18 for when the amplitude control circuit 17 supplies to the power amplifier circuit 18 the power source voltage VDD based on the amplitude of the amplitude control signal ACS. The amplitude control circuit 17 includes a variable voltage power source circuit 22, and generates a power source voltage VDD at a voltage based on the signal level of the amplitude control signal ACS and supplies the power source voltage VDD to the power amplifier circuit 18.

The power amplifier circuit 18 is an amplifier circuit that amplifies the polarity reversal signal RS or performs amplitude modulation of the carrier wave signal CS, and is configured as a class-C amplifier circuit, for example. The power amplifier circuit 18 includes, for example, a coil-shaped resistor L1 (hereinafter referred to as coil resistor L1), a transistor TR1, a first capacitor C1, a second capacitor C2, and a resistor R1.

The transistor TR1 is an n-type MOS transistor of a first conductivity type, for example. The source of the transistor TR1 is connected to ground potential. The drain of the transistor TR1 is connected to the other end of the coil resistor L1 and the second capacitor C2. The gate of the transistor TR1 is connected to the first capacitor C1 and the resistor R1.

The polarity reversal signal RS or the carrier wave signal CS is supplied through the first capacitor C1 to the gate of the transistor TR1. The gate bias voltage VG is applied through the resistor R1 to the gate of the transistor TR1. The power source voltage VDD is supplied as the drain voltage to the drain of the transistor TR1, through the coil resistor L1.

The power amplifier circuit 18 amplifies the polarity reversal signal RS or the carrier wave signal CS to derive a modulation signal MS. In other words, by amplifying the polarity reversal signal RS supplied from the polarity reversal circuit 15 in BPSK mode, the power amplifier circuit 18 derives the modulation signal MS (that is, the BPSK modulation signal). On the other hand, by amplifying the carrier wave signal CS supplied from the polarity reversal circuit 15 to perform amplitude modulation in ASK mode, the power amplifier circuit 18 derives the modulation signal MS (that is, the ASK modulation signal). The power amplifier circuit 18 outputs the modulation signal MS from the connection point between the drain of the transistor TR1 and the coil resistor L1 through the second capacitor C2.

The amplification rate of the power amplifier circuit 18 changes according to the drain voltage, that is, the power source voltage VDD, supplied to the drain of the transistor TR1. Thus, the modulation signal MS becomes a signal having an amplitude resulting from amplification (or amplitude modulation) based on the power source voltage VDD. In other words, the amplitude control circuit 17 shown in FIG. 3 changes the amplitude of the modulation signal MS by changing the power source voltage VDD on the basis of the amplitude control signal ACS.

Figure 4:
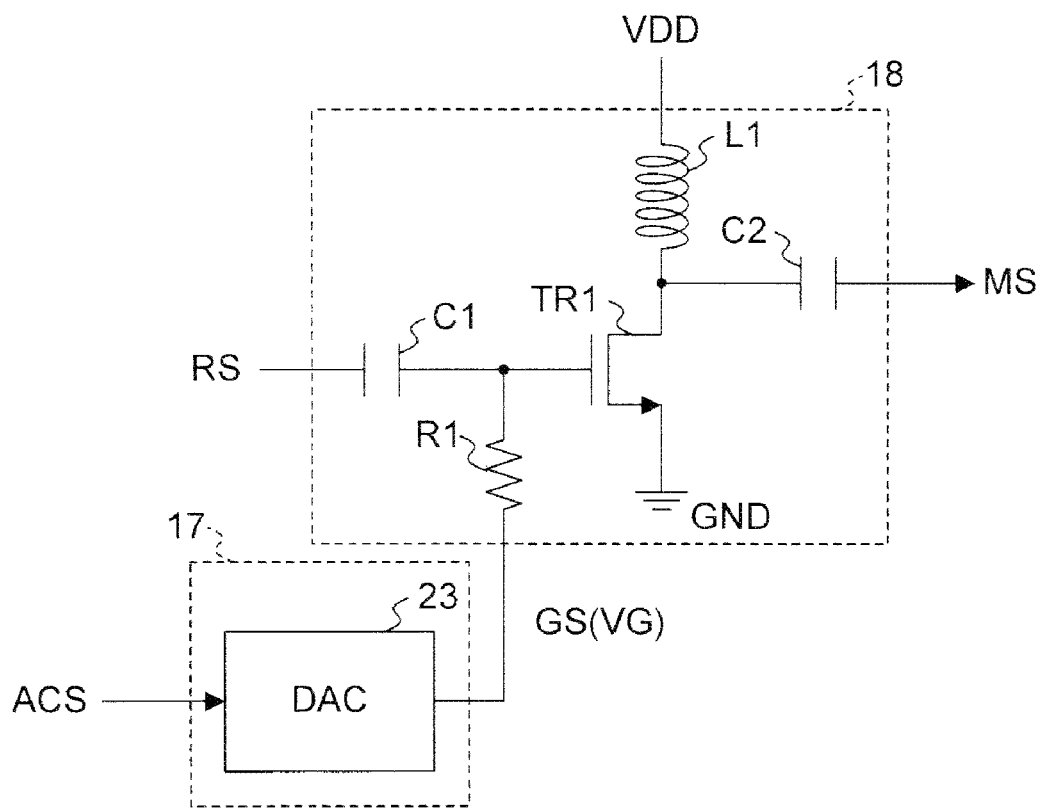
FIG. 4 shows another configuration example of an amplitude control circuit and a power amplifier circuit.

FIG. 4 shows a configuration example of the amplitude control circuit 17 and the power amplifier circuit 18 for when the amplitude control circuit 17 supplies to the power amplifier circuit 18 the gate bias voltage VG based on the signal level of the amplitude control signal ACS. The amplitude control circuit 17 includes a digital analog converter (DAC) 23 and applies the gate bias voltage VG that is based on the amplitude of the amplitude control signal ACS to the gate of the transistor TR1 of the power amplifier circuit 18.

The configuration of the power amplifier circuit 18 is similar to that shown in FIG. 3, and therefore, descriptions thereof are omitted. The power amplifier circuit 18 amplifies the polarity reversal signal RS or performs amplitude modulation on the carrier wave signal CS to derive a modulation signal MS.

The amplification rate of the power amplifier circuit 18 changes according to the gate bias voltage VG supplied to the transistor TR1. Thus, the modulation signal MS becomes a signal having an amplitude resulting from amplification (or amplitude modulation) based on the gate bias voltage VG supplied to the transistor TR1. In other words, the amplitude control circuit 17 shown in FIG. 4 changes the amplitude of the modulation signal MS by changing the gate bias voltage VG on the basis of the amplitude control signal ACS.

Figure 5:
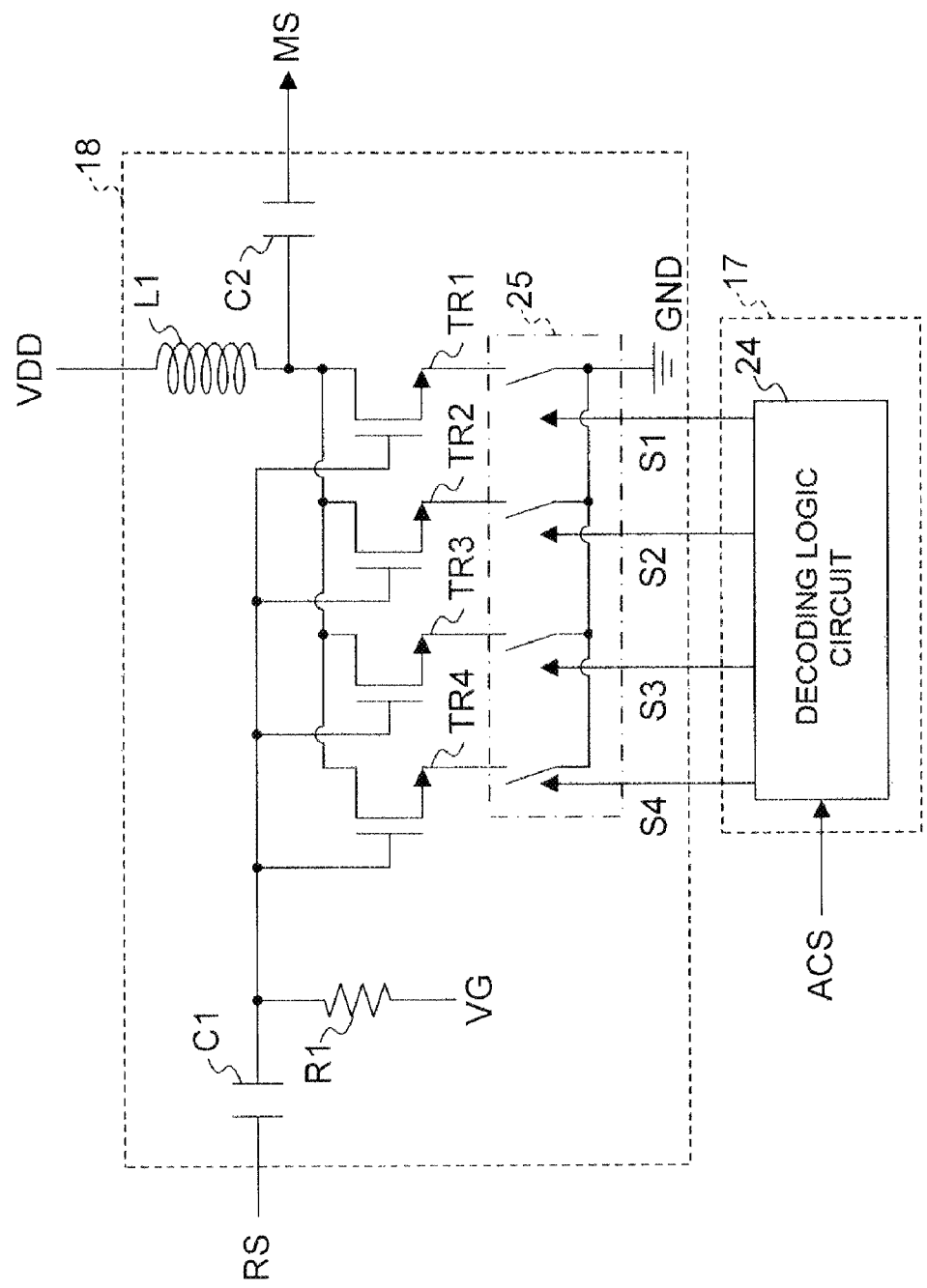
FIG. 5 shows another configuration example of an amplitude control circuit and a power amplifier circuit.

FIG. 5 shows a configuration example of the amplitude control circuit 17 and the power amplifier circuit 18 for when the power amplifier circuit 18 has amplification stages including a plurality of transistors, and the amplitude control circuit 17 switches the number amplification stages (number of transistors connected in parallel) of the power amplifier circuit 18 based on the amplitude of the amplitude control signal ACS.

The amplitude control circuit 17 includes a decoding logic circuit 24 that decodes the amplitude control signal ACS, for example. The decoding logic circuit 24 decodes the amplitude control signal ACS and generates the switch control signals S1 to S4, and supplies these to the power amplifier circuit 18. The switch control signals S1 to S4 are binary signals having levels at "1" or "0".

Unlike the circuits shown in FIGS. 3 and 4, the power amplifier circuit 18 includes a first transistor TR1, a second transistor TR2, a third transistor TR3, a fourth transistor TR4, and a switch changeover unit 25 that can switch the connections of the first to fourth transistors TR1 to TR4 to ground potential.

The first to fourth transistors TR1 to TR4 are n-type MOS transistors of a first conductivity type, for example, and are connected in parallel so as to be switchable. The drains of the first to fourth transistors TR1 to TR4 are connected to the other end of the coil resistor L1 and the second capacitor C2. The gates of the first to fourth transistors TR1 to TR4 are connected to the first capacitor C1 and the resistor R1. The sources of the first to fourth transistors TR1 to TR4 are connected to ground potential through the switch changeover unit 25.

The switch changeover unit 25 switches the connections between the first to fourth transistors TR1 to TR4 and ground potential on the basis of switch control signals S1 to S4 supplied from the amplitude control circuit 17 (decoding logic circuit 24).

If a switch control signal S1 with a logic value of "1" is supplied from the amplitude control circuit 17, for example, the switch changeover unit 25 connects the source of the first transistor TR1 to ground potential. In this manner, the first transistor TR1 is set as a transistor constituting an amplification stage that performs amplification in the power amplifier circuit 18. On the other hand, if a switch control signal S1 with a logic value of "0" is supplied, the switch changeover unit 25 disconnects the source of the first transistor TR1 from ground potential. In this manner, the first transistor TR1 enters an electrically floating state, and therefore does not constitute an amplification stage of the power amplifier circuit 18.

Similarly, if switch control signals S2 to S4 with a logic value of "1" are supplied, the switch changeover unit 25 connects the sources of the second to fourth transistors TR2 to TR4 to ground potential. If switch control signals S2 to S4 with a logic value of "0" are supplied, the switch changeover unit 25 disconnects the sources of the second to fourth transistors TR2 to TR4 from ground potential.

In this manner, when the switch control signal S2 with a logic value of "1" is supplied, the second transistor TR2 is set as a transistor constituting an amplification stage. Also, when the switch control signal S3 with a logic value of "1" is supplied, the third transistor TR3 is set as a transistor constituting an amplification stage. When the switch control signal S4 with a logic value of "1" is supplied, the fourth transistor TR4 is set as a transistor constituting an amplification stage.

By such switching operations, if switch control signals S1 and S2 having a logic value of "1" are supplied, for example, then the number of amplification stages that perform amplification in the power amplifier circuit 18 is two (first transistor TR1 and second transistor TR2). Also, if switch control signals S1 to S3 having a logic value of "1" are supplied, then the number of amplification stages that perform amplification in the power amplifier circuit 18 is three (first transistor TR1, second transistor TR2, and third transistor TR3). If switch control signals S1 to S4 having a logic value of "1" are supplied, then the number of amplification stages that perform amplification in the power amplifier circuit 18 is four (first transistor TR1, second transistor TR2, third transistor TR3, and fourth transistor TR4).

The amplification rate of the power amplifier circuit 18 changes according to the number of amplification stages, that is, the number of transistors that perform amplification connected in parallel. Thus, the modulation signal MS becomes a signal having an amplitude based on the number of transistors connected in parallel. In other words, the amplitude control circuit 17 shown in FIG. 5 changes the amplitude of the modulation signal MS by changing the number of transistors in the power amplifier circuit 18 connected in parallel, on the basis of the amplitude control signal ACS.

The number of transistors and the number of amplification stages are not limited to four. The power amplifier circuit 18 needs only to be constituted of a plurality of transistors connected in parallel in a switchable manner and to have amplification stages in which the number of stages can be set from 1 to n (n being an integer of 2 or greater), where the number of amplification stages can be set to k according the number k ($1 \leq k \leq n$) of transistors connected in parallel among the plurality of transistors. According to this configuration, by the amplitude control circuit 17 switching the connection of the plurality of transistors according to the amplitude of the amplitude control signal ACS, the number of amplification stages is set and the amplification rate of the power amplifier circuit 18 is controlled. The description above concerns an example of the above configuration in which n=4.

During transmission, the antenna 13 is connected to the power amplifier circuit 18 of the transmission circuit 11 through the switch SW1, and wirelessly transmits the modulation signal MS. During reception, the antenna 13 is connected to the reception circuit 12 through the switch SW1, and supplies the received reception signal JS to the reception circuit 12. The reception circuit 12 applies a decoding process on the reception signal JS and acquires the reception data signal RD.

Figure 6:
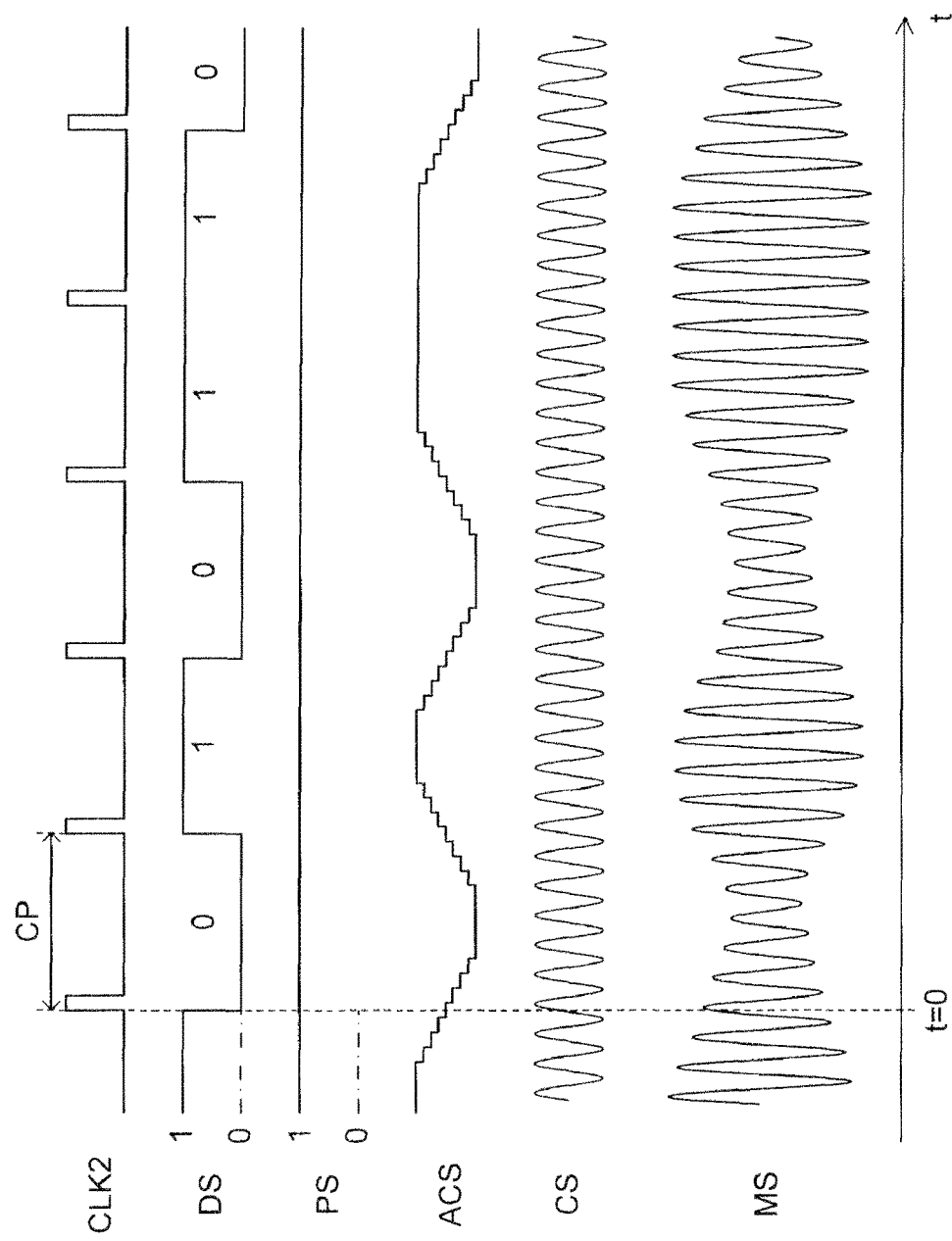
FIG. 6 is a time chart showing waveforms of signals generated in ASK mode.

Next, the operations and waveforms of the generated signals of each component of the transmission circuit 11 during wireless transmission in ASK mode will be described with reference to the time chart of FIG. 6. Here, an example will be described in which the transmission data signal DS includes a data array of "010110 . . . " In other words, the transmission data signal DS is a signal in which the signal level shifts according to "010110 . . . " in synchronization with when the data clock signal CLK2 rises (clock period CP).

The transmission data signal DS is inputted to the data input terminal T1. The switch SW2 of the transmission circuit 11 receives the mode designation signal MOD indicating ASK mode, and then connects the polarity reversal circuit 15 to the ground potential GND through the inverter N2. In this manner, a signal having a uniform signal level with a logical value of "1" is supplied to the switch SW3 of the polarity reversal circuit 15 as the polarity control signal PS.

The digital filter circuit 16 receives the operation clock signal CLK1 and the mode designation signal MOD indicating ASK mode. Also, the filter coefficient setting unit 21 of the digital filter circuit 16 sets the filter coefficient in the coefficient multipliers $M_1$ to $M_n$ according to the mode designation signal MOD indicating ASK mode. Specifically, as shown in FIG. 6, the filter coefficient setting unit 21 sets the filter coefficient of the coefficient multipliers $M_1$ to $M_n$ such that an amplitude control signal ACS is generated with a waveform in which the amplitude changes incrementally according to the signal level of the transmission data signal DS, such that while the transmission data signal DS is "1", the signal level is high, and while the transmission data signal DS is "0", the signal level is low.

The PLL circuit 14 generates a carrier wave signal CS of 900 MHz having a continuous sine wave as the waveform, and supplies this carrier wave signal to the polarity reversal circuit 15. The polarity control signal PS having a uniform signal level of "1" is supplied to the switch SW3 of the polarity reversal circuit 15, and thus, the switch SW3 maintains a state in which the PLL circuit 14 is directly connected to the power amplifier circuit 18 (that is, connected without going through the inverter N1). Thus, the polarity reversal circuit 15 supplies the carrier wave signal CS supplied from the PLL circuit 14 as is to the power amplifier circuit 18.

The amplitude control circuit 17 supplies to the power amplifier circuit 18 the amplification rate control signal GS that controls the amplification rate of the power amplifier circuit 18 on the basis of the amplitude control signal ACS. The power amplifier circuit 18 performs amplitude modulation on the carrier wave signal at an amplification rate based on the amplification rate control signal GS, or in other words, based on the amplitude control signal ACS, and generates the modulation signal MS (that is, the ASK modulation signal). Thus, the modulation signal MS is a signal resulting from performing amplitude modulation on the carrier wave signal CS at an amplification rate based on the signal level of the transmission data signal DS.

Next, the operations and waveforms of the generated signals of each component of the transmission circuit 11 during wireless transmission in BPSK mode will be described with reference to the time chart of FIG. 7. Here, similar to the time chart of FIG. 6, an example will be described in which the transmission data signal DS includes a data array of "010110 . . . "

The transmission data signal DS is inputted to the data input terminal T1. The switch SW2 of the transmission circuit 11 receives the mode designation signal MOD indicating BPSK mode, and then connects the data input terminal T1 to the polarity reversal circuit 15. In this manner, the transmission data signal DS is supplied to the switch SW3 of the polarity reversal circuit 15 as a polarity control signal PS.

The digital filter circuit 16 receives the operation clock signal CLK1 and the mode designation signal MOD indicating BPSK mode. Also, the filter coefficient setting unit 21 of the digital filter circuit 16 sets the filter coefficient in the coefficient multipliers $M_1$ to $M_n$ according to the mode designation signal MOD indicating BPSK mode. Specifically, as shown in FIG. 7, the filter coefficient setting unit 21 sets the filter coefficient of the coefficient multipliers $M_1$ to $M_n$ such that an amplitude control signal ACS is generated with a waveform in which the amplitude thereof is temporarily low (that is, minimum value) when the value of the transmission data signal DS changes from "0" to "1" or from "1" to "0". Here, "temporarily" signifies a period shorter than one clock period CP of the data clock signal CLK2.

The PLL circuit 14 generates a carrier wave signal CS of 900 MHz having a continuous sine wave as the waveform, and supplies this carrier wave signal to the polarity reversal circuit 15. The transmission data signal DS is supplied as the polarity control signal PS to the switch SW3 of the polarity reversal circuit 15, and thus, the switch SW3 switches the connection depending on the signal level of the transmission data signal DS such that when the signal level of the polarity control signal PS is "1", the PLL circuit 14 is directly connected to the power amplifier circuit 18, and when the signal level of the polarity control signal PS is "0", the PLL circuit 14 is connected to the power amplifier circuit 18 through the inverter N1. In this manner, the polarity reversal circuit 15 generates a polarity reversal signal RS having a waveform having the same polarity (positive polarity) as the carrier wave signal CS when the value of the polarity control signal PS is "1", and the opposite polarity (negative polarity) in which the logic level of the carrier wave signal CS is reversed when the value of the polarity control signal PS is "0". In other words, the polarity reversal signal RS has the same phase as the carrier wave signal CS while the signal level of the polarity control signal PS is "1", and is in the opposite phase, that is, 180° in relation to the carrier wave signal CS while the signal level of the polarity control signal PS is "0".

The amplitude control circuit 17 supplies to the power amplifier circuit 18 the amplification rate control signal GS that controls the amplification rate of the power amplifier circuit 18 on the basis of the amplitude control signal ACS. The power amplifier circuit 18 amplifies the polarity reversal signal RS at an amplification rate based on the amplification rate control signal GS, or in other words, based on the amplitude control signal ACS, and attains the modulation signal MS (that is, the BPSK modulation signal). Thus, the modulation signal MS temporarily has a low amplification rate (that is, the minimum value) when the signal level of the transmission data signal DS shifts, and while the signal level of the transmission data signal DS does not change the modulation signal MS is a signal resulting from amplifying the polarity reversal signal RS at a constant high rate of amplification.

As described above, the polarity reversal signal RS has the same phase as the carrier wave signal CS while the value of the transmission data signal DS is "1", and is in the opposite phase, that is, 180° in relation to the carrier wave signal CS while the value of the transmission data signal DS is "0". In other words, the polarity reversal signal RS is a signal that is shifted by 180° in relation to the carrier wave signal CS on the basis of the transmission data signal DS. Thus, the modulation signal MS rises and falls around when the phase shifts (that is, when the signal level of the transmission data signal DS shifts) and temporarily has a low rate of amplification (that is, the minimum value), and while the phase does not change the modulation signal MS is a signal resulting from amplifying the polarity reversal signal RS at a constant high rate of amplification.

In this manner, the power amplifier circuit 18 in the transmission circuit 11 of the present invention amplifies the polarity reversal signal RS at the minimum amplification rate when the phase reverses, and amplifies the polarity reversal signal RS at a high amplification rate while the phase is being maintained. Thus, it is possible to amplify the signal while mitigating the occurrence of spurious emission during a phase shift in BPSK modulation.

As described above, the transmission circuit 11 of the present invention generates the amplitude control signal AC that changes the amplification rate of the power amplifier circuit 18 according to the signal level of the transmission circuit DS and amplifies (that is, performs amplitude modulation on) the carrier wave signal CS at the same amplification rate, thereby attaining the modulation signal MS. Thus, there is no need to perform a process whereby the transmission data signal DS is converted to an analog signal and mixed with the carrier wave signal CS, which obviates the need for a D/A converter or a mixer. As a result, it is possible to perform wireless transmission by the ASK modulation mode while mitigating an increase in circuit size.

Also, in BPSK mode, the transmission circuit 11 of the present invention generates the polarity reversal signal RS in which the polarity of the carrier wave signal CS is reversed according to the signal level of the transmission data signal DS, thereby performing a phase shift. Thus, because there is no need to perform a process of conversion to an I signal (in-phase signal) and a Q signal (quadrature signal), there is no need to provide two systems to handle the I signal and the Q signal, and an adder to add the I signal to the Q signal is also unnecessary. As a result, it is possible to perform wireless transmission by BPSK modulation mode while mitigating an increase in circuit size.

In the transmission circuit 11 of the present invention, regardless of ASK mode or BPSK mode, amplification (amplitude modulation) is performed according to the signal level of the amplitude control signal ACS in the power amplifier circuit 18. In other words, the power amplifier circuit 18 includes both an amplitude modulation means for ASK mode and a signal amplification means for both modes, and thus, unlike conventional configurations, there is no need to amplify the signal again after modulation. Thus, there is no need to perform linear amplification of the signal after modulation, which obviates the need for linear amplifier circuits with low power efficiency such as class-A or class-B amplifier circuits. Thus, a class-C amplifier circuit or the like with a higher power efficiency can be used as the power amplifier circuit 18, enabling wireless transmission to be performed while reducing power consumption.

Also, in the transmission circuit 11 of the present invention, the digital filter circuit 16 switches the setting of the filter coefficient according to the mode designation signal MOS and filters the transmission data signal DS, and generates amplitude control signals ACS with differing waveforms depending on whether ASK mode or BPSK mode is being used. Therefore, there is no need to provide separate digital filters for the respective modes, and thus, it is possible to perform modulation and wireless transmission while mitigating an increase in circuit size.

Thus, according to the present invention, it is possible to perform wireless transmission by both ASK and BPSK modulation modes while mitigating an increase in circuit size and power consumption.

The present invention is not limited to the embodiment above. For example, in the embodiment above, an example is described in which the polarity reversal circuit 15 includes an inverter N1 and a switch SW3. However, the configuration of the polarity reversal circuit 16 is not limited to this configuration, and may use a selector instead of the switch SW3, for example. Additionally, polarity reversal may be performed using a differential signal, and the polarity reversal circuit 16 may include an XOR circuit or a multiplier circuit.

Also, in the embodiment above, an example was described in which the PLL circuit 14 generates a 900 MHz carrier wave signal CS. However, the carrier wave signal CS is not limited to this frequency.

Additionally, in the embodiment above, an example was described in which the switch SW2 and the digital filter circuit 16 switch between ASK mode and BPSK mode on the basis of the mode designation signal MOD supplied from outside. However, a configuration may be adopted in which the data speed of the transmission data signal DS, which is inputted to the data input terminal T1, is used to determine whether to perform ASK or BPSK and then switch between the transmission modes.

Also, in the embodiment above, an example was described in which the power amplifier circuit 18 is constituted of a class-C amplifier circuit. However, the power amplifier circuit 18 may be constituted of a class-D or class-E amplifier circuit.

What is claimed is:

1. A wireless transmission device for modulating, by amplitude-shift keying (ASK) or phase-shift keying (PSK), a data signal including an array of binary signal levels, and transmitting a modulated data signal, the wireless transmission device comprising:
    a modulation designation reception circuit configured to receive an ASK designation signal that designates the ASK or a PSK designation signal that designates the PSK;
    a signal generation circuit configured to generate a carrier wave signal;
    an amplitude control signal generation circuit configured to receive the data signal, and to generate an amplitude control signal having an amplitude corresponding to a change in a signal level of the data signal;
    a polarity reversal circuit configured to generate a polarity reversal signal by reversing a polarity of the carrier wave signal according to the signal level of the data signal in response to reception of the PSK designation signal by the modulation designation reception circuit;
    an amplifier circuit configured
        to generate a PSK signal by amplifying the polarity reversal signal at an amplification rate based on the amplitude control signal in response to the reception of the PSK designation signal by the modulation designation reception circuit, and
        to generate an ASK signal by modulating an amplitude of the carrier wave signal at the amplification rate based on the amplitude control signal in response to reception of the ASK designation signal by the modulation designation reception circuit; and
    a transmission circuit configured to transmit the ASK signal or the PSK signal;
    wherein the amplitude control signal generation circuit includes a filter circuit configured to filter the data signal to generate the amplitude control signal, using a filter coefficient that differs depending on whether the ASK designation signal or the PSK designation signal is received.

2. The wireless transmission device according to claim 1, wherein the amplitude control signal
    changes the amplification rate of the amplifier circuit based on the signal level of the data signal in response to the reception of the ASK designation signal by the modulation designation reception circuit, and
    sets the amplification rate of the amplifier circuit to be a first rate at a timing at which the signal level of the data signal shifts, in response to the reception of the PSK designation signal by the modulation designation reception circuit.

3. The wireless transmission device according to claim 2, wherein the amplification rate of the amplifier circuit is adjusted before and after said timing by the amplitude control signal, in response to the reception of the PSK designation signal by the modulation designation reception circuit.

4. The wireless transmission device according to claim 2, wherein the first rate is a minimum value of the amplification rate.

5. The wireless transmission device according to claim 1, further comprising an amplitude control circuit configured to supply to the amplifier circuit a power source voltage having a value based on the amplitude of the amplitude control signal, to control the amplification rate of the amplifier circuit.

6. The wireless transmission device according to claim 1, further comprising an amplitude control circuit configured to control the amplification rate of the amplifier circuit on the basis of the amplitude control signal, wherein
the amplifier circuit includes a metal-oxide-semiconductor (MOS) transistor that amplifies the polarity reversal signal or modulates the amplitude of the carrier wave signal, and
the amplitude control circuit supplies to a gate of the MOS transistor a bias voltage having a value based on the amplitude of the amplitude control signal, to control the amplification rate of the amplifier circuit.

7. The wireless transmission device according to claim 1, further comprising an amplitude control circuit configured to control the amplification rate of the amplifier circuit on the basis of the amplitude control signal, wherein
the amplifier circuit includes a plurality of transistors switchably connected in parallel and has a plurality of amplification stages,
a number of the amplification stages is set to k according a number k of transistors connected in parallel among the plurality of transistors, k being an integer of 2 or greater, and
the amplitude control circuit switches a connection of the plurality of transistors according to the amplitude of the amplitude control signal and controls the amplification rate of the amplifier circuit by setting the number of the amplification stages.

8. A wireless transmission method for transmitting a modulated signal by modulating a data signal including an array of binary signal levels, using amplitude-shift keying (ASK) or phase-shift keying (PSK), the method comprising:
receiving an ASK designation signal that designates the ASK or a PSK designation signal that designates the PSK;
generating a carrier wave signal;
receiving the data signal and generating an amplitude control signal having an amplitude corresponding to a change in a signal level of the data signal;
generating a polarity reversal signal by reversing a polarity of the carrier wave signal according to the signal level of the data signal in response to reception of the PSK designation signal by a modulation designation reception circuit;
generating a PSK signal by amplifying the polarity reversal signal at an amplification rate based on the amplitude control signal in response to the reception of the PSK designation signal by the modulation designation reception circuit, and generating an ASK signal by modulating an amplitude of the carrier wave signal at an amplification rate based on the amplitude control signal in response to reception of the ASK designation signal by the modulation designation reception circuit; and
transmitting the ASK signal or the PSK signal;
wherein the generating the amplitude control signal includes filtering the data signal using a filter coefficient that differs depending on whether the ASK designation signal or the PSK designation signal is received.

9. The wireless transmission method according to claim 8, wherein the amplitude control signal
changes the amplification rate based on the signal level of the data signal in response to the reception of the ASK designation signal by the modulation designation reception circuit, and
sets the amplification rate to be a first rate at a timing at which the signal level of the data signal shifts, in response to the reception of the PSK designation signal by the modulation designation reception circuit.

10. The wireless transmission method according to claim 9, wherein the amplification rate is adjusted before and after said timing by the amplitude control signal, in response to the reception of the PSK designation signal by the modulation designation reception circuit.

11. The wireless transmission method according to claim 9, wherein the first rate is a minimum value of the amplification rate.

12. The wireless transmission method according to claim 8, further comprising:
supplying to an amplifier circuit a power source voltage having a value based on an amplitude of the amplitude control signal, to control the amplification rate.

13. The wireless transmission method according to claim 8, further comprising:
supplying to a metal-oxide-semiconductor (MOS) transistor of an amplifier circuit a gate bias voltage having a value based on the amplitude of the amplitude control signal, to control the amplification rate.

14. The wireless transmission method according to claim 8, further comprising:
switching a connection of transistors of an amplifier circuit according to an amplitude of the amplitude control signal and setting a number of amplification stages of the amplifier circuit, to control the amplification rate.

15. A wireless transmission device for modulating, by amplitude-shift keying (ASK) or phase-shift keying (PSK), a data signal including an array of binary signal levels, and transmitting a modulated data signal, the wireless transmission device comprising:
a modulation designation reception circuit configured to receive an ASK designation signal that designates the ASK or a PSK designation signal that designates the PSK;
a signal generation circuit configured to generate a carrier wave signal;
an amplitude control signal generation circuit configured to receive the data signal, and to generate an amplitude control signal having an amplitude corresponding to a change in a signal level of the data signal;
a polarity reversal circuit configured to generate a polarity reversal signal by reversing a polarity of the carrier wave signal according to the signal level of the data signal in response to reception of the PSK designation signal by the modulation designation reception circuit;
an amplifier circuit configured to generate a PSK signal by amplifying the polarity reversal signal at an amplification rate based on the amplitude control signal in response to the reception of the PSK designation signal by the modulation designation reception circuit, and to generate an ASK signal by modulating an amplitude of the carrier wave signal at the amplification rate based on the amplitude control signal in response to reception of the ASK designation signal by the modulation designation reception circuit;

a transmission circuit configured to transmit the ASK signal or the PSK signal; and an amplitude control circuit configured to control the amplification rate of the amplifier circuit on the basis of the amplitude control signal, wherein the amplifier circuit includes a metal-oxide-semiconductor (MOS) transistor that amplifies the polarity reversal signal or modulates the amplitude of the carrier wave signal, and the amplitude control circuit supplies to a gate of the MOS transistor a bias voltage having a value based on the amplitude of the amplitude control signal, to control the amplification rate of the amplifier circuit.

* * * * *